United States Patent [19]

Ott et al.

[11] Patent Number: 5,451,305
[45] Date of Patent: Sep. 19, 1995

[54] PROCESS FOR COATING ELECTRICALLY CONDUCTIVE SUBSTRATES, A WATER-BASED COATING AND A CROSSLINKING AGENT CONTAINING MASKED NCO GROUPS

[75] Inventors: Günther Ott, Münster; Udo Reiter, Telgte; Walter Jouck, Münster, all of Germany

[73] Assignee: BASF Lacke +Farben AG, Muenster-Hiltrup, Germany

[21] Appl. No.: 955,703

[22] PCT Filed: May 31, 1991

[86] PCT No.: PCT/EP91/01012

§ 371 Date: Feb. 9, 1994

§ 102(e) Date: Feb. 9, 1994

[87] PCT Pub. No.: WO92/00358

PCT Pub. Date: Jan. 9, 1992

[30] Foreign Application Priority Data

Jun. 23, 1990 [DE] Germany .................. 40 20 115.5

[51] Int. Cl.⁶ .............................................. C25D 13/10
[52] U.S. Cl. ............................ 204/181.7; 204/181.1; 523/402; 523/404

[58] Field of Search ................ 204/181.7, 181.4; 523/404, 402

[56] References Cited

U.S. PATENT DOCUMENTS

| 4,892,897 | 1/1990 | Redman ................ 204/181.7 |
| 5,324,402 | 6/1994 | Ott et al. ................ 204/181.7 |

*Primary Examiner*—John Niebling
*Assistant Examiner*—Kishor Mayekar
*Attorney, Agent, or Firm*—Anne Gerry Sabourin

[57] ABSTRACT

The invention relates to a cathodic electro-dipping process wherein the electro-dipping primer employed contains a crosslinking agent which can be obtained by reacting a) a diol and/or a triol or a mixture of diols and/or a mixture of triols, b) diphenylmethane 4,4'-diisocyanate the melting point of which has been depressed, by partial reaction with a monool and/or polyol or a mixture of monools and/or a mixture of polyols, so far that it is liquid at room temperature and c) a masking agent or a mixture of masking agents to give a crosslinking agent which is free from isocyanate groups.

12 Claims, No Drawings

PROCESS FOR COATING ELECTRICALLY CONDUCTIVE SUBSTRATES, A WATER-BASED COATING AND A CROSSLINKING AGENT CONTAINING MASKED NCO GROUPS

BACKGROUND OF THE INVENTION

The invention relates to a process for coating electrically conductive substrates, in which
(1) the electrically conductive substrate is dipped into a water-based electro-dipping primer
(2) the substrate is connected as the cathode
(3) a film is deposited on the substrate by means of direct current
(4) the coated substrate is removed from the electro-dipping primer and
(5) the deposited film coating is baked.

The invention also relates to water-based coatings and crosslinking agents containing masked NCO groups.

The cathodic electro-dipping process described above is known (cf., for example, German Offenlegungsschrift 3,518,732, German Offenlegungsschrift 3,518,770, EP-A 4090, EP-A 12,463 and EP-A 262,069) and is employed, in particular, for priming motor vehicle bodies, especially automobile bodies.

Coatings of excellent quality can be obtained by means of the cathodic electro-dipping process—particularly if electro-dipping primers containing cationic, amine-modified epoxide resins are used as binders.

The electro-dipping primers employed for carrying out the cathodic electro-dipping process preferably contain masked polyisocyanates as crosslinking agents. It is known that if masked diphenylmethane 4,4'-diisocyanate (MDI) is used as the crosslinking agent, the troublesome discoloration (yellowing) of topcoat layers which is observed when other aromatic polyisocyanates are used does not occur. MDI can, however, not be employed without difficulty, because it exhibits a strong tendency to crystallize and thus leads to the destabilization of the electro-dipping primers. It is stated in EP-A 236,050 that stable electro-dipping primers should be obtainable using MDI containing at least 5% by weight of the 2,4'-isomer. However, commercially obtainable MDI grades meeting this condition as a rule have, disadvantageously, a high content of hydrolyzable chlorine leading to electro-dipping primers of high chloride ion contents, i.e. of increased corrosivity. It is stated in EP-A 293,088 that stable electro-dipping primers should be obtainable using MDI containing a uretonimine. However, this suggestion for solving the crystallization problem unfortunately does not lead to success in all cases.

SUMMARY OF THE INVENTION

The object on which the present invention is based is the provision of crosslinking agents based on MDI for water-based electro-dipping primers, in the use of which electro-dipping primers stable on storage are obtained.

DESCRIPTION OF THE PREFERRED EMBODIMENTS

Surprisingly, this object is achieved by the provision of masked polyisocyanates which are obtainable by reacting a) a diol and/or a triol or a mixture of diols and/or a mixture of triols,
b) diphenylmethane 4,4'-diisocyanate the melting point of which has been depressed, by partial reaction with a monool and/or polyol or a mixture of monools and/or a mixture of polyols, so far that it is liquid at room temperature and
c) a masking agent or a mixture of masking agents
to give a crosslinking agent which is free from isocyanate groups.

In principle, any organic compound containing, as a statistical average, at least two hydroxyl groups per molecule can be employed as component (a). It is also possible to employ mixtures of such organic compounds. Linear, optionally branched, aliphatic diols having 2 to 12 C atoms in the molecule, poly-(ethylene oxide), poly(propylene oxide) and poly-(ethylene oxide)(propylene oxide) having number average molecular weights of 100 to 1000, preferably 200 to 400, and linear, optionally branched, aliphatic triols having 2 to 12 C atoms in the molecule are mentioned as examples of polyols which can be employed. Examples of suitable polyols are ethylene glycol, propylene glycols, butanediols, neopentyl glycol, hexanediols, dimethylolcyclohexane, glycerol, trimethylolethane, trimethylolpropane, trimethylolhexane, pentaerythritol, dipentaerythritol, pentaerythritol mono and diallyl ethers and trimethylolpropane allyl ether. It is preferable to employ a trimethylolpropane as component (a).

Diphenylmethane 4,4'-diisocyanate, the melting point of which has been depressed, by partial reaction with a monool and/or polyol or a mixture of monools and/or a mixture of polyols, so far that it is liquid at room temperature, is employed as the component (b). In addition to the reaction products from diphenylmethane 4,4'-diisocyanate and monools or polyols, the diphenylmethane 4,4'-diisocyanate employed as the component (b) can also contain, if desired, diphenylmethane 2,4'-diisocyanate and/or reaction products thereof with monools or polyols and/or diphenylmethane 2,2'-diisocyanate and/or reaction products thereof with monools or polyols and/or oligomers, and/or reaction products of the latter with monools or polyols and/or uretonimines and/or reaction products thereof with monools or polyols.

The preparation of diphenylmethane 4,4'-diisocyanate the melting point of which has been depressed, by partial reaction with a monool and/or polyol or a mixture of monools and/or a mixture of polyols, so far that it is liquid at room temperature, is known and is described, for example, in the patent documents German Offenlegungsschrift 1,618,380, German Offenlegungsschrift 2,624,526; German Offenlegungsschrift 3,241,450, German Offenlegungsschrift 3,831,681, German Offenlegungsschrift 3,818,769, German Offenlegungsschrift 2,913,126, German Offenlegungsschrift 2,347,207, German Offenlegungsschrift 2,404,166, German Offenlegungsschrift 2,513,793, German Offenlegungsschrift 2,513,796, German Offenlegungsschrift 2,622,104, GB-A 1,479,096, GB-A 1,528,045, EP-A 13,487, GB-A 2,034,708, EP-A 10,850, GB-A 2,066,813, EP-A 31,650 and EP-A 31,207. The component (b) is also commercially available and is offered for sale, for example, by Bayer AG, BASF AG, Dow Chemicals and ICI PlC.

Diphenylmethane 4,4'-diisocyanate which has been modified by partial reaction with polyols or a mixture of polyols so that it is liquid at room temperature is preferably employed as the component (b). Examples of suitable polyols for modifying the diphenylmethane 4,4'-diisocyanate are linear or branched, aliphatic diols having a molecular weight of 62–700, such as, for example, compounds of the formula R (OH)$_2$ in which R is an aliphatic hydrocarbon radical having 2 to 6 carbon atoms, such as, for example, neopentyl glycol, ethylene glycol, propylene 1,2-diol, propylene 1,3-diol, butylene 1,2-diol, butylene 1,3-glycol, 1,4-butanediol or hexamethylene glycol. Other suitable polyols are polyalkylene glycols, such as, for example, diethylene glycol, triethylene glycol, tetraethylene glycol, dipropylene glycol, tripropylene glycol or polyoxyethylenepolyols or polyoxypropylene-polyols or polyoxypropylene-polyoxyethylene-polyols having a number average molecular weight of up to 1000. It is often advisable to employ mixtures of the said polyols for the modification.

Preferred polyols are polyoxypropylene-polyols having a number average molecular weight of 134–700 or mixtures thereof and also tripropylene glycol and tetrapropylene glycol or mixtures thereof.

The monools or polyols, preferably the abovementioned polyols, employed for depressing the melting point should be reacted with diphenylmethane 4,4'-diisocyanate or a mixture of diphenylmethane 4,4'-diisocyanate and oligomers and/or diphenylmethane 2,4'-diisocyanate and/or diphenylmethane 2,2'-diisocyanate and/or uretonimine in an amount such that 0.1 to 50, preferably 1 to 30 and particularly preferably 10 to 30, percent of the NCO groups are converted into urethane groups by reaction with the hydroxyl groups of the monools or polyols.

The modification of the isocyanate mixture containing diphenylmethane 4,4'-diisocyanate or diphenylmethane 4,4'-diisocyanate is preferably carried out in such a way that the polyisocyanate mixture containing the diphenylmethane 4,4'-diisocyanate to be modified or the diphenylmethane 4,4'-diisocyanate to be modified is initially taken and the monool or polyol or mixture of monools and/or polyols serving as the modifying agent is added with stirring. The reaction is preferably carried out in the presence of an inert gas atmosphere. The modification reaction is generally carried out at between 20° and 140° C., preferably between 40° and 80° C. The modification reaction can also be carried out continuously by metering the monool or polyol component into a stream of polyisocyanate.

In principle, any masking agents suitable for polyisocyanates, for example linear, optionally branched, aliphatic monoalcohols having 1 to 12 C atoms in the molecule or mixtures of such monoalcohols, can be employed as the component (c). The following are mentioned as examples of monoalcohols of this type: methanol, ethanol, propanol, trimethylolpropane diallyl ether, butanol, pentanol, pentaerythritol triallyl ether, hexanol, heptanol, isodecanol and 2-ethylhexanol. It is also possible to employ glycol ethers of the general formula CH$_3$(CH$_2$)$_n$—O—(CH$_2$—CH$_2$—O—)$_m$H or mixtures of such glycol ethers as the component (c). In the general formula n is an integer from 0 to 5, preferably 2 to 5, and m is an integer from 1 to 3, preferably 1 or 2. Propylglycol, propyldiglycol, butylglycol and butyldiglycol are mentioned as examples of glycol ethers which can be employed. It is also possible to employ propylene glycol ethers of the general formula CH$_3$(CH$_2$)$_n$—O—(CH$_2$—CHCH$_3$—O—)$_m$H or mixtures of such propylene glycol ethers (n is an integer from 0 to 5 and m is an integer from 1 to 3) as the component (c).

It is preferable to employ glycol ethers or mixtures of glycol ethers of the general formula CH$_3$(CH$_2$)$_n$—O—(CH$_2$—CH$_2$—O—)$_m$H described above as the component (c).

The reaction of the components (a), (b) and (c) can preferably be carried out at temperatures from 20° to 80° C. The reaction can be catalyzed by means of catalysts, for example, dibutyltin dilaurate.

The crosslinking agents according to the invention can, in principle, be employed in any coatings containing a binder having groups reactive towards NCO groups (for example hydroxyl groups and/or primary amino groups and/or secondary amino groups and/or thiol groups). The crosslinking agents according to the invention are preferably employed in electro-dipping primers which can be deposited at the anode and at the cathode.

Electro-dipping primers which can be deposited at the anode are described, for example, in the U.S. Pat. No. 3,366,563, U.S. Pat. No. 3,369,983, U.S. Pat. No. 3,403,088, U.S. Pat. No. 3,530,054, U.S. Pat. No. 3,565,781 and U.S. Pat. No. 3,772,227.

It is particularly preferable to employ the crosslinking agents according to the invention in electro-dipping primers which can be deposited at the cathode and which contain, as the binder, cationic, amine-modified epoxide resins. Electro-dipping primers of this type are known and are described, for example, in German Offenlegungsschrift 3,518,770, German Offenlegungsschrift 3,518,732, EP-B 102,501, German Offenlegungsschrift 2,701,002, U.S. Pat. No. 4,104,147, EP-A-4090, EP-A-12,463 and U.S. Pat. Nos. 4,031,050, 3,922,253, 4,101,486, 4,038,232 and 4,017,438. The preparation of the cationic, amine-modified epoxide resins involved is also described in detail in these patent documents.

Cationic, amine-modified epoxide resins are to be understood as meaning cationic reaction products formed from ($\alpha$) optionally modified polyepoxides and
($\beta$) amines.

These cationic, amine-modified eposide resins can be prepared by reacting the components ($\alpha$) and ($\beta$) and—if necessary—subsequently protonizing the product. It is also possible, however, to react an unmodified polyepoxide with an amine and to carry out further modifications on the amine-modified epoxide resin thus obtained.

Polyepoxides are to be understood as meaning compounds containing two or more epoxide groups in the molecule.

($\alpha$)-components which are particularly preferred are compounds which can be prepared by reacting (i) a diepoxide compound or a mixure of diepoxide compounds having an epoxide equivalent weight of less than 2000 with
(ii) a compound which, under the given reaction conditions, reacts in a monofunctional manner toward epoxide groups and contains a phenol or thiol group, or a mixture of such compounds, the components (i) and (ii) being employed in a molar ratio of 10:1 to 1:1, preferably 4:1 to 1.5:1, and the reaction being carried out at 100° to 190° C., if appropriate in the presence of a catalyst (cf. German Offenlegungsschrift 3,518,770).

Other ($\alpha$)-components which are particularly preferred are compounds which can be prepared by a poly-addition reaction at 100° to 195° C., which is optionally carried out in the presence of a catalyst and is initiated by an initiator which reacts in a monofunctional manner and carries either an alcoholic OH group, a phenolic OH group or an SH group, of a diepoxide compound and/or a mixture of diepoxide compounds, if appropriate together with at least one monoepoxide compound, to give an epoxide resin in which the diepoxide compound and the initiator have been incorporated in a molar ratio of over 2:1 to 10:1 (cf. German Offenlegungsschrift 3,518,732).

Polyepoxides which can be employed for the preparation of the particularly preferred ($\alpha$)-components and can also themselves be employed as ($\alpha$)-components, are polyglycidyl ethers of polyphenols prepared from polyphenols and epihalogenohydrins. Examples of polyphenols which it is very particularly preferable to employ are bisphenol A and bisphenol F. In addition 4,4'-dihydroxybenzophenone, bis-(4-hydroxyphenyl)-1,1-ethane, bis-(4-hydroxyphenyl)-1,1-isobutane, bis-(4-hydroxy-tert-butylphenyl)-2,2-propane, bis-(2-hydroxynaphthyl)-methane, 1,5-dihydroxynaphthalene and phenolic novolak resins are also suitable.

Other suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)-2,2-propane. It is also possible to employ polyglycidyl esters of polycarboxylic acids, such as, for example, oxalic acid, succinic acid, glutaric acid, terephthalic acid, 2,6-naphthalenedicarboxylic acid or dimerized linoleic acid. Glycidyl adipate and glycidyl phthalate are typical examples.

Hydantoin epoxides, epoxidized polybutadiene and polyepoxide compounds obtained by epoxidizing an olefinically unsaturated aliphatic compound are also suitable.

Modified polyepoxides are to be understood as meaning polyepoxides in which some of the reactive groups have been reacted with a modifying compound.

The following are mentioned as examples of modifying compounds:

compounds containing carboxyl groups, such as saturated or unsaturated monocarboxylic acids (for example benzoic acid, linseed oil fatty acid, 2-ethylhexanoic acid and Versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid or dimethylolpropionic acid) and also polyesters containing carboxyl groups or compounds containing amino groups, such as diethylamine or ethylhexylamine, or diamines having secondary amino groups, for example N,N'-dialkylalkylenediamines, such as dimethylethylenediamine, N,N'-dialkylpolyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis N,N'-cyanoethylpolyoxypropylenediamine, polyaminoamides, such as, for example, Versamides, in particular reaction products containing terminal amino groups and formed from diamines (for example hexamethylenediamine) and polycarboxylic acids, in particular dimeric fatty acids, and monocarboxylic acids, in particular fatty acids, or the reaction product of one mole of diaminohexane with two moles of a monoglycidyl ether or monoglycidyl ester, especially glycidyl esters of $\alpha$-branched fatty acids, such as Versatic acid, or compounds containing hydroxyl groups, such as neopentyl glycol, bisethoxylated neopentyl glycol, neopentyl glycol hydroxypivalate, dimethylhydantoin-N,N'-diethanol, 1,6-hexanediol, 2,5-hexanediol, 1,4-bis-(hydroxymethyl)-cyclohexane, 1,1-isopropylidene-bis-(p-phenoxy)-2-propanol, trimethylolpropane or pentaerythritol, or aminoalcohols, such as triethanolamine or methyldiethanolamine, or alkylketimines containing hydroxyl groups, such as aminomethyl-1,3-propanediol-methyl isobutyl ketimine or tris-(hydroxymethyl)-aminomethanecyclohexanone ketimine, and also polyglycol ethers, polyester-polyols, polyether-polyols, polycaprolactone-polyols or polycaprolactam-polyols of various functionalities and molecular weights or saturated or unsaturated fatty acid methyl esters which are transesterified in the presence of sodium methylate with hydroxyl groups of the epoxide resins.

Primary and/or secondary amines can be employed as the component ($\beta$).

The amine should preferably be a compound soluble in water. Examples of such amines are monoalkylamines and dialkylamines, such as methylamine, ethylamine, propylamine, butylamine, dimethylamine, diethylamine, dipropylamine, methylbutylamine and the like. Alkanolamines, such as, for example, methylethanolamine, diethanolamine and the like, are also suitable. Dialkylaminoalkylamines, such as, for example, dimethylaminoethylamine, diethylaminopropylamine, dimethylaminopropylamine and the like, are also suitable. It is also possible to employ amines containing ketimine groups, for example the methyl isobutyl diketimine of diethylenetriamine. Low molecular weight amines are used in most cases, but it is also possible to use monoamines of a fairly high molecular weight.

The amines can also contain other groups, but these should not interfere with the reaction between the amine and the epoxide group and should also not result in gelling of the reaction mixture.

It is preferable to employ secondary amines as the ($\beta$)-components.

The charges required for dilutability with water and deposition by electrical means can be produced by protonation with water-soluble acids (for example boric acid, formic acid, lactic acid or preferably acetic acid). Another possible means of introducing cationic groups into the component ($\alpha$) consists in reacting epoxide groups of the component ($\alpha$) with amine salts.

The cationic, amine-modified epoxide resins can be employed either as extraneously crosslinking synthetic resins or as self-crosslinking synthetic resins. Self-crosslinking, cationic, amine-modified epoxide resins can be obtained, for example, by chemical modification of the cationic, amine-modified epoxide resins. A self-crosslinking system can, for example, be obtained by reacting the cationic, amine-modified epoxide resin with a partially masked polyisocyanate which has on average one free isocyanate group per molecule and in which the masked isocyanate groups only become demasked at elevated temperatures. A precursor of the crosslinking agents according to the invention which still has, on a statistical average, one free NCO group in the molecule can also be employed as the partially masked polyisocyanate.

As a rule the crosslinking agents according to the invention are employed in an amount of 5 to 60% by weight, preferably 20 to 40% by weight, relative to the amount of cationic, amine-modified epoxide resin present in the electro-dipping primer.

In addition to the crosslinking agent according to the invention and the cationic, amine-modified epoxide resin (it is, of course, also possible to employ a mixture of different cationic, amine-modified epoxide resins), the electro-dipping primers in question can also contain other constituents, such as, for example, pigments, plasticizers, fillers, wetting agents, organic solvents, antioxidants, etc.

The solids content of the electro-dipping primers is preferably 7 to 35 parts by weight, particularly preferably 12 to 25 parts by weight. The pH of the electro-dipping primers is between 6 and 8, preferably between 6.5 and 7.5.

The electro-dipping primer is brought into contact with an electrically conductive anode and with the electrically conductive substrate, connected as the cathode. When an electric current is passed between the anode and the cathode, a firmly adhering film coating is deposited on the cathode.

The voltage applied can vary within a wide range and can, for example, be between two and one thousand volts. It is typical, however, to use voltages between 50 and 500 volts. The current density is, as a rule, between about 10 and 100 amperes/m$^2$. The current density tends to fall off in the course of the deposition.

After the deposition the coated article is rinsed and is ready for baking.

The film coatings deposited are generally baked at temperatures from 130° to 200° C. for a time of 10 to 60 minutes, preferably at 150° to 180° C. for a time of 15 to 30 minutes.

Any desired electrically conductive substrates can be used as the electrically conductive substrates, but it is preferable to employ metals, such as steel, aluminum, copper and the like.

The invention is illustrated in greater detail in the following examples. All data relating to parts and percentages are by weight, unless anything contrary is expressly stated.

1. Preparation of a crosslinking agent according to the invention 2500 g (10 mol) of diphenylmethane 4,4'-diisocyanate are melted in a reaction vessel equipped with a stirrer, a reflux condenser and an inlet tube for inert gas, and are mixed, at 50° C. with stirring, with 2400 g of Pluriol P 600 (polypropylene glycol, molecular weight 600, manufactured by BASF AG). The mixture is then warmed gradually to 70° C. and kept at this temperature for a further 30 minutes. The NCO equivalent weight is then 402 g/equivalent. The mixture is then diluted with 2778 g of methyl isobutyl ketone, 4 g of dibutyltin dilaurate are added and 1458 g (9 mol) of diethylene glycol monobutyl ether are run in in the course of 90 minutes at such a rate that the internal temperature does not exceed 70° C., with external counter-cooling applied. 134 g (1 mol) of melted trimethylolpropane are then added. The mixture is allowed to react exothermically and is then heated to 110° C. and kept at this temperature for a further 90 minutes. After this isocyanate groups can no longer be detected. After cooling, the product obtained is a pale yellow crosslinking solution which has a solids content of 71.2% (determined at 130° C. for 1 hour) and which shows no tendency to crystallize when stored at room temperature.

2. Preparation of a cationic, amine-modified epoxide resin 43.73 parts of an epoxide resin based on bisphenol A and having an EEW (epoxide equivalent weight) of 188, 8.84 parts of bisphenol A, 10.16 parts of dodecylphenol and 3.08 parts of xylene are placed in a reactor under an atmosphere of nitrogen and are heated to 130° C. 0.06 part of triphenylphosphine is then added, whereupon the temperature rises briefly to 160° C. When the temperature has fallen to 130° C. again 0.16 part of N,N-dimethylaminobenzylamine is added and the mixture is kept at 130° C. for approx. 2 hours more, until the EEW has risen to 810. 3.50 parts of butylglycol, 5.30 parts of diethanolamine and 8.13 parts of xylene are then added, with cooling. When the temperature has fallen to 90° C. the reaction mixture is kept at 90° C. for a further hour. It is then cooled further and 3.50 parts of propylene glycol phenyl ether and 11.57 parts of isobutanol are added. 1.98 parts of N,N-dimethylaminopropylamine are added at 60° C. The mixture is then kept at 60° C. for a further 2 hours and is heated to 90° C. and kept at this temperature for a further hour until its viscosity remains constant, and is then discharged after cooling briefly. The pale yellow solution has a solids content of 70.2% (1 hour at 130° C.) and a viscosity of 2.5 dPas (40% strength solution in methoxypropanol, determined at 23° C. on a plate-cone instrument). The amine content is 1.26 milliequivalents per g of solid resin.

3. Preparation of a water-based binder dispersion

A water-based binder dispersion is prepared by mixing 1040 parts of the resin according to item 2, 560 parts of the crosslinking agent described under item 1, 41 parts of 88% strength lactic acid and 2 parts of an antifoaming solution[1] at room temperature. 597 parts of demineralized water are then added in portions and with stirring to the mixture, which is now homogeneous. After being homogenized for 30 minutes, the mixture is diluted further with a further 960 parts of demineralized water, added in portions. It is then stirred for a further 30 minutes, and the volatile solvents are then removed by vacuum distillation at 45° C. and are replaced by the same amount of demineralized water. A stable, water-based dispersion having a solids content of 34.8% (1 hour at 130° C.) is obtained. The chloride content of the dispersion is 50 ppm.

[1] 50% strength solution of Surfynol (manufacturer Air Products) in butylglycol.

4. Preparation of a gray pigment paste 27.81 parts of bisphenol A diglycidyl ether, 1.44 parts of xylene and 5.81 parts of bisphenol A are reacted, in the presence of 0.002 part of triphenylphosphine at 150°–160° C. until an EEW of 345 has been reached. The mixture is then diluted with 21.61 parts of butylglycol and cooled to 49° C. A mixture of 7.77 parts of 9-amino-3,6-dioxanonane-1-ol and 4.07 parts of N,N-dimethylaminopropylamine is then added in the course of 6 minutes, whereupon the temperature rises to 110° C. The mixture is kept at between 110° and 115° C. for 1 hour and 6.45 parts of butylglycol are then added and the mixture is cooled to 77° C. 14.9 parts of nonylphenol glycidyl ether are then added. The temperature then rises to 90° C. and is kept at this level for 1 hour before the mixture is diluted with 10.03 parts of butylglycol and cooled. The solids content of the highly fluid resin solution is 60%.

The pigment paste is prepared by first making a premix of 29.33 parts of water, 1.59 parts of 90% strength acetic acid and 21.60 parts of the resin solution described above. 0.7 part of anti-foamer (1), 0.5 part of carbon black, 4.8 parts of basic lead pigment, 6.75 parts of Extender HEWP (2), 32.48 parts of titanium dioxide (R 900) and 2.25 parts of dibutyltin oxide are then added and the mixture is pre-dispersed for 30 minutes under a high-speed Dissolver stirrer. The mixture is then dispersed in a small laboratory-mill (Motor Mini Mill, Eiger Engineering Ltd., Great Britain) for 1 to 1.5 hours, until a Hegmann fineness of 12 or less has been reached, and its viscosity is adjusted with further water to the desired figure for application. The result is a pigment paste which is very stable to demulsification.

(1) "Tristar Antifoam", Tristar Chemical Co., Dallas, USA (2) English China Clay Int., Great Britain 5. Preparation of a water-based electro-dipping primer and deposition and testing of the resulting film coating 1925 parts of a water-based binder dispersion are diluted with 2500 parts of demineralized water and 2 parts of 30% strength lactic acid. 573 parts of the pigment paste described under item 4 are then stirred into the binder dispersion which has been diluted in this way. The solids content of the solution is 20%.

The electro-dipping primer is allowed to age, with stirring, for 3 days at room temperature. The film coatings are deposited in the course of 2 minutes at 220 volts onto zinc phosphated steel test panels connected as the cathode. The temperature of the solution is kept at 25° C. meanwhile. The deposited wet film is rinsed with demineralized water and baked at 165° C. for 20 minutes.

This gives a hard film coating having a layer thickness of 22 μm and very good flow as well as very good stability towards solvents (tested by rubbing to and fro 20 times with a cotton wool wad impregnated with acetone). Another coated panel is re-coated with a white automobile finish in a layer thickness of about 50 μm and is subjected to a yellowing test. After baking, the white finish exhibits no traces of yellowing.

We claim:

1. A process for coating electrically conductive substrates comprising the steps of
    (1) dipping the electrically conductive substrate into a water-based electro-dipping primer
    (2) connecting the substrate as the cathode
    (3) depositing a film on the substrate by means of direct current
    (4) removing the coated substrate from the electro-dipping primer and
    (5) baking the deposited film coating,
wherein the water-based electro-dipping primer contains a crosslinking agent obtained by reacting
    a) a compound selected from the group consisting of a diols, triols, and mixtures thereof, with
    b) diphenylmethane 4,4'-diisocyanate the melting point of which has been depressed, by partial reaction with a compound selected from the group consisting of monools, polyols and mixtures thereof, so far that it is liquid at room temperature and then with
    c) a masking agent or a mixture of masking agents,
said crosslinking agent being free from isocyanate groups.

2. The process as claimed in claim 1, wherein glycol ethers of the general formula $CH_3(CH_2)_n$—O—$(CH_2$—$CH_2$—O—$)_m$H or mixtures of glycol ethers of this type are employed as the component (c), n being an integer from 0 to 5 and m being an integer from 1 to 3.

3. A water based coating containing a crosslinking agent obtained by reacting
    a) a compound selected from the group consisting of diols, triols and mixtures thereof,
    b) diphenylmethane 4,4'-diisocyanate the melting point of which has been depressed, by partial reaction with a compound selected from the group consisting of monools, polyols and mixtures thereof, so far that it is liquid at room temperature and then with
    c) a masking agent or a mixture of masking agents,
said crosslinking agent being free from isocyanate groups.

4. The coating as claimed in claim 3, wherein glycol ethers of the general formula $CH_3(CH_2)_n$—O—$(CH_2$—$CH_2$—O—$)_m$H or mixtures of glycol ethers of this type are employed as the component (c), n being an integer from 0 to 5 and m being an integer from 1 to 3.

5. A crosslinking agent containing masked NCO groups, obtained by reacting
    a) a compound selected from the group consisting of diols, triols and mixtures thereof,
    b) diphenylmethane 4,4'-diisocyanate the melting point of which has been depressed, by partial reaction with a compound selected from the group consisting of monools, polyols and mixtures thereof, so far that it is liquid at room temperature and then with
    c) a masking agent or a mixture of masking agents,
said crosslinking agent being free from isocyanate groups.

6. The crosslinking agent as claimed in claim 5, wherein glycol ethers of the general formula $CH_3(CH_2)_n$—O—$(CH_2$—$CH_2$—O—$)_m$H or mixtures of glycol ethers of this type are employed as the component (c), n being an integer from 0 to 5.

7. The process as claimed in claim 1, wherein glycol ethers of the general formula $CH_3(CH_2)_n$—O—$(CH_2$—$CH_2$—O—$)_m$H or mixtures of glycol ethers of this type are employed as the component (c), n being an integer from 2 to 5 and m being an integer from 1 to 3.

8. The coating as claimed in claim 3, wherein glycol ethers of the general formula $CH_3(CH_2)_n$—O—$(CH_2$—$CH_2$—O—$)_m$H or mixtures of glycol ethers of this type are employed as the component (c), n being an integer from 2 to 5 and m being an integer from 1 to 3.

9. The crosslinking agent as claimed in claim 5, wherein glycol ethers of the general formula $CH_3(CH_2)_n$—O—$(CH_2$—$CH_2$—O—$)_m$H or mixtures of glycol ethers of this type are employed as the component (c), n being an integer from 2 to 5 and m being an integer from 1 to 3.

10. A process for coating electrically conductive substrates comprising the steps of
    (1) dipping the electrically conductive substrate into a water-based electro-dipping primer
    (2) connecting the substrate as the cathode
    (3) depositing a film on the substrate by means of direct current
    (4) removing the coated substrate from the electro-dipping primer and
    (5) baking the deposited film coating, wherein the water-based electro-dipping primer contains a crosslinking agent obtained by reacting a) a compound selected from the group consisting of a diols, triols, and mixtures thereof, with b) diphenylmethane 4,4'-diisocyanate the melting point of which has been depressed, by partial reaction with a compound selected from the group consisting of monools, polyols and mixtures thereof, so far that it is liquid at room temperature and then with c) a masking agent or a mixture of masking agents selected from the group consisting of glycol ethers of the general formula $CH_3(CH_2)_n-O-(CH_2-CH_2-O-)_mH$ or mixtures of glycol ethers of this type are employed as the component (c), n being an integer from 0 to 5 and m being an integer from 1 to 3, said masking agent being free from isocyanate groups.

11. A water based coating containing a crosslinking agent obtained by reacting a) a compound selected from the group consisting of diols, triols and mixtures thereof, b) diphenylmethane 4,4'-diisocyanate the melting point of which has been depressed, by partial reaction with a compound selected from the group consisting of monools polyols and mixtures thereof, so far that it is liquid at room temperature and then with c) a masking agent or a mixture of masking agents selected from the group consisting of glycol ethers of the general formula $CH_3(CH_2)_n-O-(CH_2-CH_2-O-)_mH$ or mixtures of glycol ethers of this type, n being an integer from 0 to 5 and m being an integer from 1 to 3, said masking agent being free from isocyanate groups.

12. A crosslinking agent containing masked NCO groups, obtained by reacting a) a compound selected from the group consisting of diols, triols and mixtures thereof, b) diphenylmethane 4,4'-diisocyanate the melting point of which has been depressed, by partial reaction with a compound selected from the group consisting of monools, polyols and mixtures thereof, so far that it is liquid at room temperature and then with c) a masking agent or a mixture of masking agents selected from the group consisting of glycol ethers of the general formula $CH_3(CH_2)_n-O-(CH_2-CH_2-O-)_mH$ or mixtures of glycol ethers of this type, n being an integer from 0 to 5 and m being an integer from 1 to 3, said masking agent being free from isocyanate groups.

* * * * *